Jan. 26, 1943.   R. POLK, SR., ET AL   2,309,328
METHOD OF EXTRACTING JUICES FROM CITRUS FRUITS AND OTHER SIMILAR FRUITS
Original Filed Oct. 23, 1936   3 Sheets-Sheet 1

INVENTOR.
Ralph Polk Sr. and
Ralph Polk Jr.,
BY Hood & Hahn.
ATTORNEYS.

Jan. 26, 1943.  R. POLK, SR., ET AL  2,309,328
METHOD OF EXTRACTING JUICES FROM CITRUS FRUITS AND OTHER SIMILAR FRUITS
Original Filed Oct. 23, 1936   3 Sheets—Sheet 3
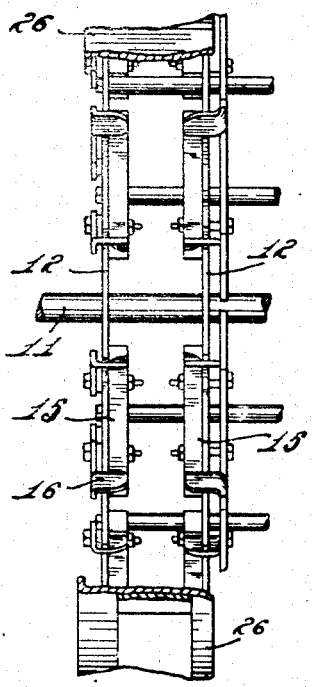
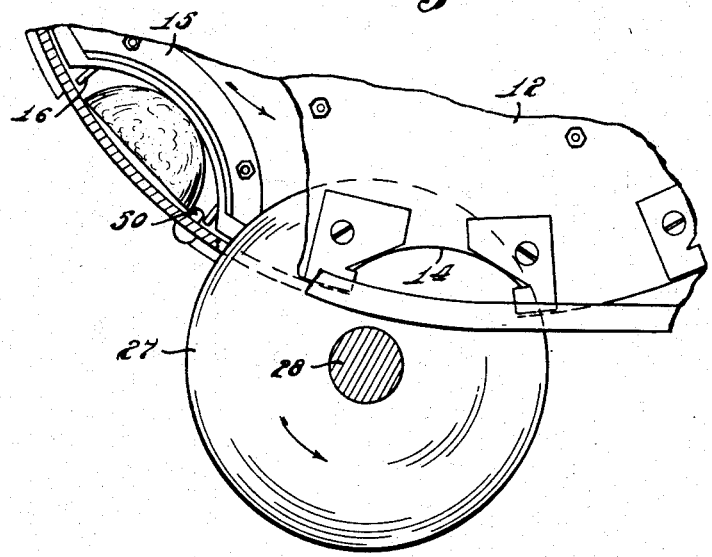
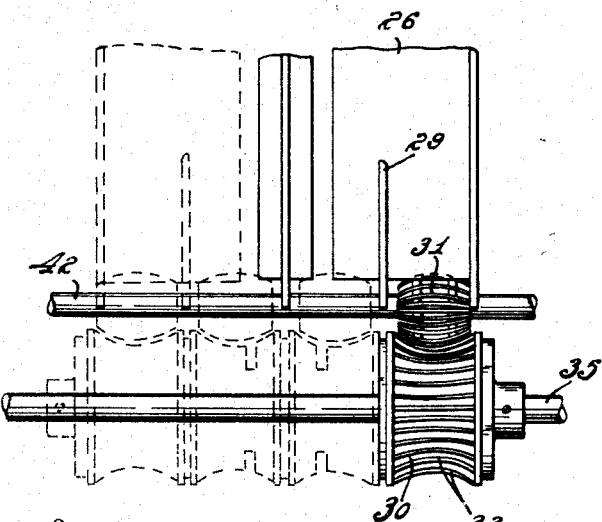
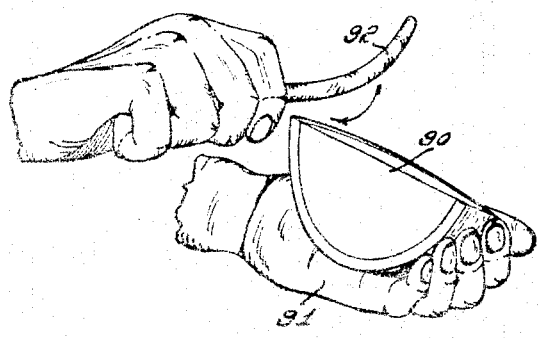
INVENTORS.
Ralph Polk Sr. and
Ralph Polk Jr.,
BY  Hood & Hahn.
ATTORNEYS.

Patented Jan. 26, 1943

2,309,328

UNITED STATES PATENT OFFICE 2,309,328

METHOD OF EXTRACTING JUICES FROM CITRUS FRUITS AND OTHER SIMILAR FRUITS

Ralph Polk, Sr., Tampa, and Ralph Polk, Jr., Haines City, Fla., assignors to The Polk Development Company, Tampa, Fla., a copartnership Original application October 23, 1936, Serial No. 107,208. Divided and this application November 29, 1937, Serial No. 177,134

6 Claims. (Cl. 146—219)

This application is a division from our application Serial No. 107,208 filed October 23, 1936, which has matured to Patent No. 2,236,916, granted April 1, 1941.

The object of our present invention is to provide an improved method by means of which juices of citrus and other similar fruits may be more economically separated from rind, fiber and seeds, if any, in such manner that the possibility of contamination of the fruit juices by juice of the skin, fiber and seeds may be practically eliminated.

We have discovered that if the fruit be segmented into segments of substantially less than 180 degrees of skin arc, the segments may then be subjected to a continuously scrubbing or rubbing pressure continuously progressive from one pole of the segment to the other at a rubbing speed exceeding the speed of transportation of the segment so that the juice cells will be progressively ruptured without the necessity of subjecting the fruit segments to pressures normal to the skin sufficient to express from the seeds, fiber and skin, any substantial amount of the juices contained in the seeds, fiber and skin, and that if the skin be so externally supported as to prevent substantial distortion of its normal transverse arc, the segments may be projected in rapid succession across the rubbing element in such manner that the skin will not be substantially cracked as to free any material portion of its acrid oily content.

Our improved method, therefore, involves primarily the application of a pressure radially of the fruit segment progressively applied from one polar end of the fruit segment to the other, together with a rubbing against the fruit cells at a speed in excess of the polarwise movement of the segment, said rubbing action being progressively applied to the fruit cells from one polar end of the segment to the other.

While our improved method may be performed by hand, it will, manifestly, be more commercially profitable when performed mechanically and automatically.

The accompanying drawings illustrate mechanism for that purpose, including, as well, mechanism for segmenting the whole fruit. The drawings also illustrate the practice of the method by hand assisted by the use of a rubbing element.

Fig. 3 is a fragmentary elevation, in partial vertical section, of the halving cutter disc and adjacent parts, with the feed chute omitted;

Fig. 4 is a section on line 4—4 of Fig. 3;

Fig. 8 is a fragmentary elevation of the fruit-forwarding head showing one series of half-fruit pockets;

Fig. 9 is a fragmentary side elevation, in partial vertical section, of the quartering cutter disc and adjacent parts;

Fig. 10 is a plan of an adjacent pair of juicer throats; and

Fig. 11 is an illustration of the performance of our method by hand.

Figure 1:
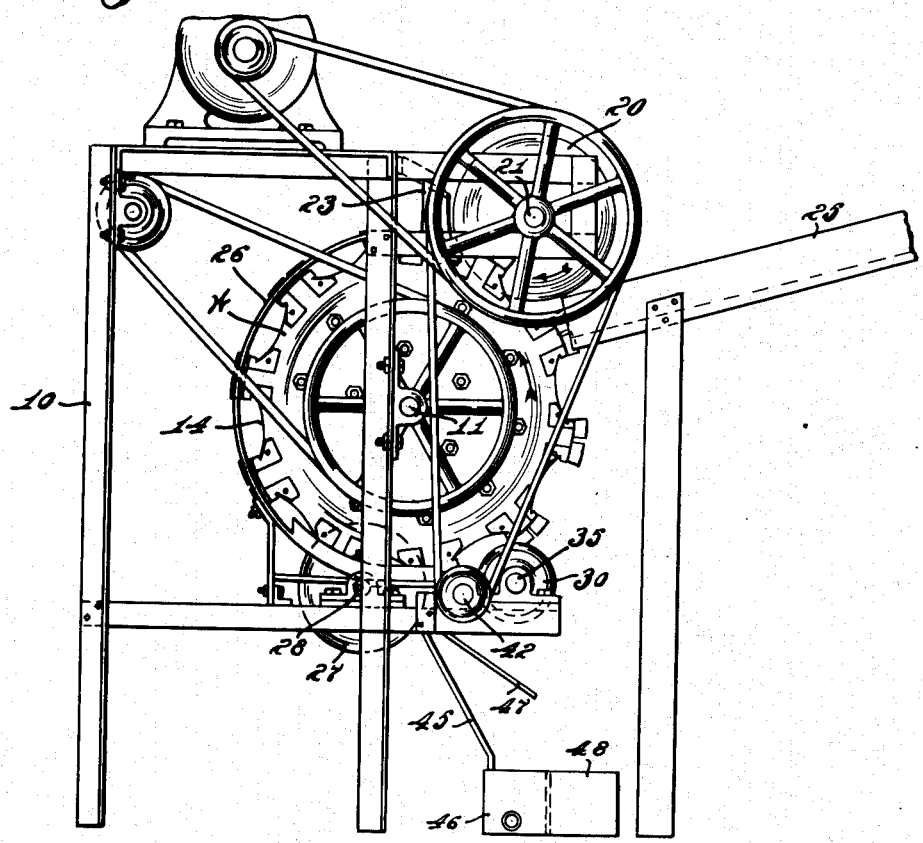
Fig. 1 is a side elevation.
Figure 2:
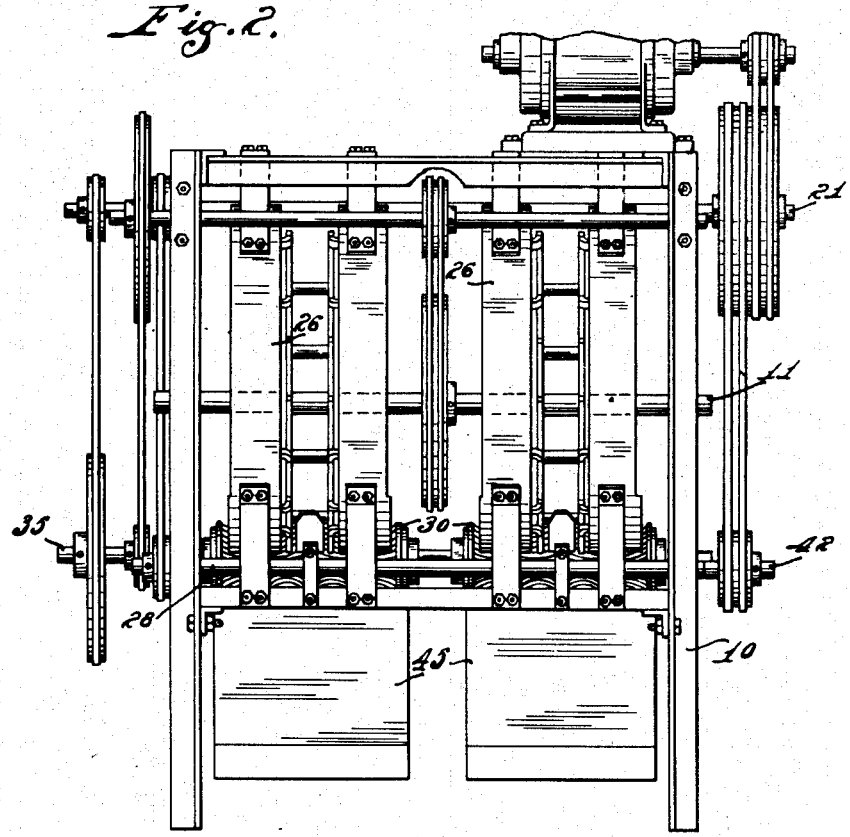
Fig. 2 is a rear end elevation.
Figure 5:
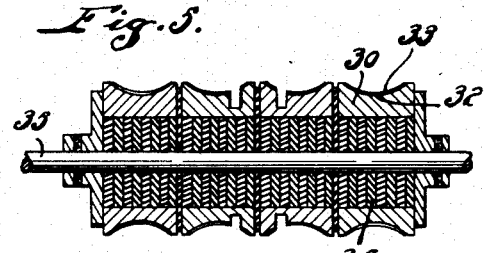
Fig. 5 is an axial section of a series of segment-forwarding elements of the juicer unit on line 5—5 of Fig. 6.

In the drawings 10 indicates a suitable main frame in which is journaled a horizontal-axis shaft 11 which carries the fruit-forwarding wheel W. This head comprises coaxial discs 12, axially spaced at approximately an average fruit diameter and attached to shaft 11 to rotate therewith. Each of these discs is peripherally notched by a series of notches 14 and each of these notches is flanked, on the inner faces of each end pair of discs, with fruit-cradled segments 15, thereby forming a series of circumferentially spaced fruit cradles or pockets adapted to receive fruit halves. At each outer corner of each fruit cradle is an inwardly projecting ear 16 arranged to form an extended contactor for the fruit half adjacent its cut face.

Attached to the adjacent inner faces of the two middle discs 12, and aligned with each fruit-half cradle is a plate 17 notched in its outer edge at 18 so as to form, by each adjacent pair of plates, a whole-fruit receptacle or pocket having whole-fruit engaging tips 19. The bottoms of the notches 18 are a little higher than the bottoms of the notches 14 for a purpose which will appear.

Arranged in the medial vertical plane, between adjacent plates 17 is a rotary cutter disc 20 carried by shaft 21 and between each side of this cutter disc and the flanking plate 17 is a stripper finger 22 which is carried by a vertical plate 23 which lies immediately to the rear of the cutter disc 20 and is a trifle thicker than that disc.

Leading to the throat between the forwarding element W and the whole-fruit cutter disc 20 is a downwardly inclined fruit chute 25 through which the whole-fruit will be delivered by gravity to the forwarding element.

Immediately to the rear of plate 23, each series of half-fruit pockets of the forwarding element W is covered by an arch-shaped cover 26 which extends around and beneath the forwarding element so as to retain the half-fruits in their respective pockets until they arrive beneath the forwarding element and to the throat of the juicer unit, to be described.

Arranged in medial vertical plane between each end pair of plates 12, near the lower part of the forwarding element W is a vertical cutter disc 27, said cutter disc being carried by shaft 28 journalled in the main frame, and immediately beyond the delivery end of each cover plate 26 (Fig. 6) is a divider plate 29 which is slightly thicker than the adjacent cutter disc.

The delivery end of each cover plate 26 leads to the throat of the juicer unit which comprises a segment-forwarding element 30 and a pulp-rubbing element 31. Each segment-forwarding element 30 is circumferentially grooved at 32 approximating the arc of the largest fruit segment which is to be handled, and this groove is provided with a plurality of transverse ribs 33 adapted to frictionally engage, preferably without penetration, the external surface of the skin of a fruit segment. Each element 30 is provided with a radially yieldable bushing 34 by means of which it is mounted upon shaft 35 to partake of the rotation of said shaft but capable of a radial yield approximating the variation in thickness of the fruit skins.

Figure 6:
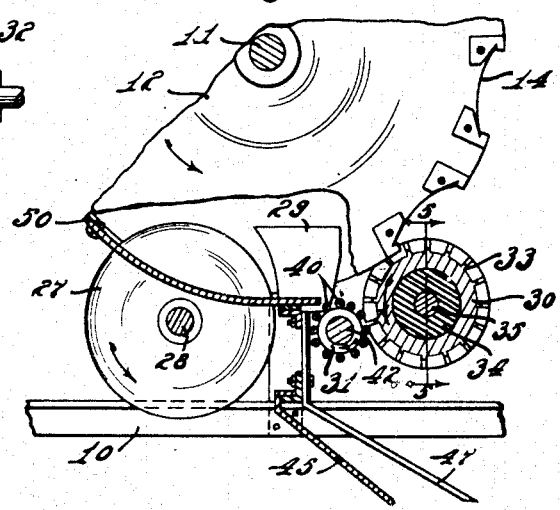
Fig. 6 is a fragmentary vertical section on one of the juicer units and adjacent parts.
Figure 7:
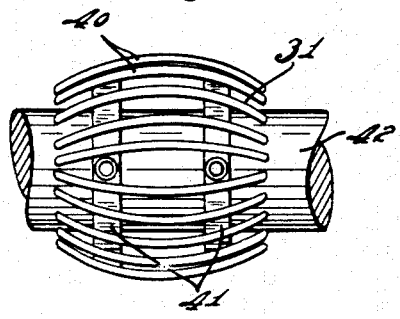
Fig. 7 is an elevation of one of the juice expressing elements of the juicer unit.

The pulp rubber 31 is formed by a circumferential series of arc-shaped wires or rods 40 attached to the peripheries of a pair of discs 41. The curvature of the rods 40 is arranged to be substantially concentric with the curvature of the groove 32 of the adjacent forwarding element 30 and the arrangement of these rods is such, as clearly indicated in Fig. 7, as to afford ready outlet therebetween for the expressed fruit juice and pulp. The several rubber elements 31 are mounted upon a shaft 42 and the two shafts 35 and 42 are rotated in opposite directions as indicated in Fig. 6, shaft 42 being rotated at a very much higher speed than shaft 35.

Subtending the throats of the juicer elements is a juice-drainage plate 45 leading to a suitable juice receptacle 46 and interposed between the throats of the juicer elements and the plate 45 is a skin deflector guide conveniently composed of a plurality of parallel wires or rods 47 which serve to separate the fruit skins from the juice and deflect said skins to a suitable receptacle 48, the bottom of which may conveniently be an endless carrier (not shown) for the continuous removal of the accumulating denuded skins.

Interposed between the receiving edge of the quartering cutter 27 and the accompanying fruit halves are two fruit obstructors 50 balanced on the medial line of the runway and conveniently short pins sharpened at their rear edge, for a purpose which will appear. Shafts 11, 21, 35 and 42 are rotated, at appropriate speeds, from a suitable source of power. We have found in practice that if the segment-forwarding element 30 is rotated at ninety revolutions per minute, the cooperating pulp-engaging element 31 (conveniently referred to as a burr) may best be rotated at about sixteen hundred revolutions per minute. The forwarding element W should be rotated at such speed as to force the fruits into as rapid cutting association with the cutter discs as possible without crowding the fruit unduly, and the cutter discs 20 and 27 should be rotated at comparatively high speed relative to the rotation of the forwarding element W.

The operation is as follows:

Whole fruit rolling in a single series down chute 25 and arriving at the periphery of the forwarding element W are successively picked up by the whole-fruit pocket notches of plate 17, one on each side of the whole-fruit cutter 20, and carried into engagement with and past said cutter 20, acting to cut the fruit in halves. At about the time the fruit is nearly halved, it is brought into engagement with the stripper fingers 22, the upper faces of which are slightly above the adjacent periphery of the cutter disc, but without destroying the forwarding contact of the rear tips 19 so that the fruit halves continue to be forwarded until they come in contact with the divider plate 23, the fruit halves at that time being substantially balanced upon the edges of the plate 17. The divider plate 23 unbalances the fruit halves and permits them to tip over in opposite directions into the adjacent fruit half-cradles whereupon the fruit halves are carried around beneath the forwarding element W, being retained within their position by the cover plates 26. Each fruit half, as it reaches the medial horizontal plane of the forwarding element W is likely to drop downwardly into engagement with the foresides of its retaining pocket, and it slides along the cover 26 until it comes in contact with the obstructors 50 which centralize it in the runway and detain it until the rear edge of the fruit pocket again contacts with the fruit, whereupon the fruit is driven over the obstructor and into cutting association with the quartering cutter 27 by which the fruit half if quartered and permitted to proceed in quarters to the divider plate 29 which deflects each quarter into the throat of the appropriate juicer unit, the forward polar tip of the fruit segment entering between the two elements of the juicer unit. The forwarding element 30 of the juicer unit, moving at relatively slow speed and engaging the outer surface of the skin of the fruit segments, forwards the fruit segment through the juicer unit, while the rods 40 of the relatively high speed burr 31 compress and rub the fruit pulp polarwise of the segment, the skin being retained substantially in its normal arc and the forwarding elements yielding radially due to the yieldable bushing 34, to compensate for variations in skin thickness. The fruit quarters arrive at the throats of the juicer units lying on one radial face but, as the tips of the segments become caught between the elements 30 and 31, the segments tend to centralize in the throat of the juicer element so that the juice and edible pulp is rapidly expressed by simultaneous radial compression and polarwise rubbing action which, in practice, is found to be exceedingly efficient.

The arc-shaped backing support of the segments, afforded by the arc-shaped circumferential groove of the forwarding element 30 during the radially outwardly compression and polarwise rubbing afforded by the burr rotating about an axis concentric with the curvature of the backing support, results in a thorough bursting of the juice cells of the fruit and a rapid and thorough expression of the juice and removal of the edible pulp without substantial cracking or bursting of the skin, thereby avoiding expression of the bitter oils and juices of the skin to commingle with the desired fruit juice.

Referring to Fig. 11, 90 indicates a fruit segment having a skin arc of substantially less than 180 degrees, 91 a cupped hand in which the segment is supported so as to prevent substantial distortion of the transverse arc of the skin in opposition to applied rubbing pressure, and 92 a rubbing rod, the fruit segment being supported in the operator's hand, the rubbing rod may be stroked against the fruit cells with a movement having both radial and polarwise components progressing through the segment polarwise, so as to rupture the juice cells, without substantial distortion of the skins, so as to free the fruit juices without contamination by the acrid oily content of the fiber, seeds and skins.

It will be readily understood that the segmentation of the fruit need not necessarily be upon arcuate radial planes or such as to entirely separate from the one segment.

As previously described, the fruit is cut into wedge shaped segments, the included angle of each of which is substantially less than 180 degrees. Such a section, therefore, has an apex line which extends from one pole to the other of the segments, and the term pole is used in the appended claims to accord with that definition.

We claim as our invention:

1. The method of citrus fruit-juice extraction which comprises the step of segmenting the fruit into segments having an included angle less than 180 degrees, and the step of subjecting such segments without preliminary crushing to radial pressure progressively from one pole of the segment to the other while supporting the skin against substantial rupture substantially through the transverse arc opposite the exerted pressure.

2. The method of citrus fruit-juice extraction which comprises the step of segmenting the fruit into segments having an included angle less than 180 degrees, and the step of subjecting such segments without preliminary crushing to radial and polarwise pressure progressively from one pole of the segment to the other while supporting the skin against substantial rupture substantially through the transverse arc opposite the exerted radial pressure.

3. The method of citrus fruit-juice extraction which comprises the step of segmenting the fruit into segments having an included angle less than 180 degrees, and the step of subjecting such segments without preliminary crushing to a rubbing pressure having both a radial component and a polarwise component said rubbing pressure being exerted progressively from one pole of the segment toward and to the other pole while externally supporting the skin against substantial rupture.

4. The method of citrus fruit-juice extraction which comprises the step of segmenting the fruit into segments having an included angle less than 180 degrees, the step of subjecting such segments without preliminary crushing to a rubbing pressure having both a radial component and a polarwise component said rubbing pressure being exerted progressively from one pole of the segment toward and to the other pole, and the step of externally supporting the skin of the segment as to its transverse arch to prevent injurious distortion of said transverse arch.

5. The method of citrus fruit-juice extraction which comprises the step of segmenting the fruit into segments having an included angle less than 180 degrees, the step of forwarding said segment endwise, the step of subjecting the pulp of the fruit to a rubbing pressure by a rotary rubber having radial and polarwise pressure components relative to the fruit segment, and the step of supporting the external surface of the skin substantially throughout the transverse arch of the segment opposite the rubbing pressure in such manner as to prevent distortion of the skin so as to cause substantial exudation of its oils.

6. The method of extracting juice from citrus fruit which comprises the initial step of cutting the fruit into wedge-shaped sections and thereafter passing said sections endwise over a convex reamer roll transversely of the axis thereof while pressing the juice bearing pulp of the sections against the periphery of the roll while externally supporting the skin against substantial rupture.

RALPH POLK, Sr.
RALPH POLK, Jr.